US007726259B2

(12) United States Patent
Hepp et al.

(10) Patent No.: US 7,726,259 B2
(45) Date of Patent: Jun. 1, 2010

(54) ANIMAL FEEDER, METHOD OF OPERATING A FEEDER, AND METHOD OF ASSEMBLING THE SAME

(76) Inventors: Kenneth R. Hepp, N76 W36455 Saddlebrook La., Oconomowoc, WI (US) 53066; Patricia A. Hepp, N76 W36455 Saddlebrook La., Oconomowoc, WI (US) 53066

( * ) Notice: Subject to any disclaimer, the term of this patent is extended or adjusted under 35 U.S.C. 154(b) by 177 days.

(21) Appl. No.: 11/588,760

(22) Filed: Oct. 27, 2006

(65) Prior Publication Data

US 2007/0095295 A1 May 3, 2007

Related U.S. Application Data

(60) Provisional application No. 60/731,318, filed on Oct. 28, 2005, provisional application No. 60/800,794, filed on May 16, 2006.

(51) Int. Cl.
*A01K 39/00* (2006.01)
(52) U.S. Cl. .................................... 119/57.9
(58) Field of Classification Search ............... 119/57.8, 119/57.9, 51.01, 52.2–52.4
See application file for complete search history.

(56) References Cited

U.S. PATENT DOCUMENTS

| D99,010 S | 3/1936 | Garwood |
|---|---|---|
| D129,632 S | 9/1941 | Bowers |
| 2,570,733 A | 10/1951 | Thomas |
| D165,628 S | 1/1952 | Blazier |
| 2,965,070 A | 12/1960 | Myrick |
| 3,126,870 A | 3/1964 | Matthew |
| 3,145,690 A | 8/1964 | Bachman |
| D220,748 S | 5/1971 | Gould |
| 4,031,856 A | 6/1977 | Chester |
| 4,037,361 A | 7/1977 | Murphy et al. |
| 4,318,364 A | 3/1982 | Bescherer |
| 4,323,035 A | 4/1982 | Piltch |
| 4,327,669 A * | 5/1982 | Blasbalg ............. 119/57.8 |

(Continued)

OTHER PUBLICATIONS

Advertisement for Squirrel Buster Classic, http://www.bromebirdcare.com/Sbc/SBCVEDetailsl.html, accessed Jan. 6, 2006.

(Continued)

*Primary Examiner*—Rob Swiatek
*Assistant Examiner*—Kristen C Hayes
(74) *Attorney, Agent, or Firm*—Michael Best & Friedrich LLP

(57) ABSTRACT

An animal feeder including a housing for containing feed and defining a plurality of openings for providing access to the feed, the plurality of openings being substantially equally spaced between an upper end of the housing and a lower end of the housing. The feeder also includes a frame having an opening and being supported on the housing for movement relative to the housing between an opened position and a closed position. The feeder further includes a hanger for supporting the animal feeder, the hanger including an elongated member extending outwardly from the frame and being connectable to the exterior support, and a sleeve extending across at least a portion of the elongated member, the sleeve being connected to the frame and being operable to move the frame relative to the housing between the opened position and the closed position.

27 Claims, 10 Drawing Sheets

U.S. PATENT DOCUMENTS

| | | |
|---|---|---|
| 4,523,546 A | 6/1985 | Latham |
| 4,541,362 A | 9/1985 | Dehls |
| 4,646,686 A | 3/1987 | Furlani |
| 4,821,681 A | 4/1989 | Tucker |
| 5,156,112 A | 10/1992 | Brown |
| 5,163,382 A | 11/1992 | Morrison |
| 5,195,459 A | 3/1993 | Ancketill |
| 5,207,180 A | 5/1993 | Graham |
| 5,285,748 A | 2/1994 | Weldin |
| 5,309,867 A | 5/1994 | Cruz |
| 5,323,735 A | 6/1994 | Meng |
| 5,335,851 A | 8/1994 | Adaska et al. |
| 5,361,723 A | 11/1994 | Burleigh |
| 5,375,558 A | 12/1994 | Drakos |
| 5,392,732 A | 2/1995 | Fry |
| 5,395,322 A | 3/1995 | Moser et al. |
| D360,495 S | 7/1995 | Sanderson |
| D360,496 S | 7/1995 | Norman |
| 5,445,109 A | 8/1995 | Gray et al. |
| 5,450,816 A | 9/1995 | Santa Cruz |
| 5,454,348 A | 10/1995 | Colwell et al. |
| 5,676,089 A | 10/1997 | Morganson |
| 5,678,507 A | 10/1997 | Kassner |
| 5,690,056 A | 11/1997 | Korb |
| 5,720,238 A | 2/1998 | Drakos |
| 5,740,759 A | 4/1998 | Cummings |
| D395,240 S | 6/1998 | Dinand |
| 5,806,460 A | 9/1998 | Klein |
| 5,826,540 A | 10/1998 | Bridges |
| 5,878,537 A | 3/1999 | Flischel |
| 5,894,813 A | 4/1999 | George |
| D409,339 S | 5/1999 | Silano et al. |
| 5,921,201 A | 7/1999 | Green |
| 5,924,382 A | 7/1999 | Shumaker |
| 5,937,788 A | 8/1999 | Boyd |
| 5,964,183 A | 10/1999 | Czipri |
| 6,056,149 A | 5/2000 | Murphy et al. |
| 6,056,206 A | 5/2000 | Whiton |
| D429,852 S | 8/2000 | Hogarty |
| 6,158,385 A | 12/2000 | Boyd |
| 6,192,832 B1 | 2/2001 | Husnik |
| D441,923 S | 5/2001 | Garcia-Lucio et al. |
| 6,230,913 B1 | 5/2001 | Cornell et al. |
| 6,253,707 B1 | 7/2001 | Cote |
| D450,892 S | 11/2001 | Garcia-Lucio et al. |
| D450,893 S | 11/2001 | Garcia-Lucio et al. |
| 6,325,019 B1 | 12/2001 | Taber |
| 6,378,458 B1 | 4/2002 | Boyd |
| 6,386,142 B1 | 5/2002 | Holscher et al. |
| 6,481,375 B1 | 11/2002 | Scalf |
| 6,499,430 B2 | 12/2002 | Garcia-Lucio et al. |
| 6,532,894 B2 | 3/2003 | Johnson |
| 6,543,384 B2 | 4/2003 | Cote |
| 6,553,936 B2 | 4/2003 | Sasso |
| 6,584,932 B2 | 7/2003 | Rogers et al. |
| 6,584,933 B1 | 7/2003 | Stone |
| 6,591,781 B2 | 7/2003 | Hardison |
| 6,598,561 B1 | 7/2003 | Johns |
| 6,612,257 B2 | 9/2003 | George |
| 6,672,249 B2 | 1/2004 | Garcia-Lucio et al. |
| 6,691,641 B2 | 2/2004 | Scalf |
| 7,093,562 B2 | 8/2006 | Smothers |
| 7,191,731 B2 * | 3/2007 | Cote .......................... 119/57.9 |
| 7,219,621 B2 * | 5/2007 | Coroneos ................... 119/57.1 |

OTHER PUBLICATIONS

Advertisement for Parasol Hummingbird Feeders, http://www.foreverflying.com/parasol.html, accessed Jun. 29, 2004.

Advertisement for Aspects RollerFeeder, http://www.aspectsinc.com/368_ Rfdr.htm, accessed Jan. 20, 2007.

* cited by examiner

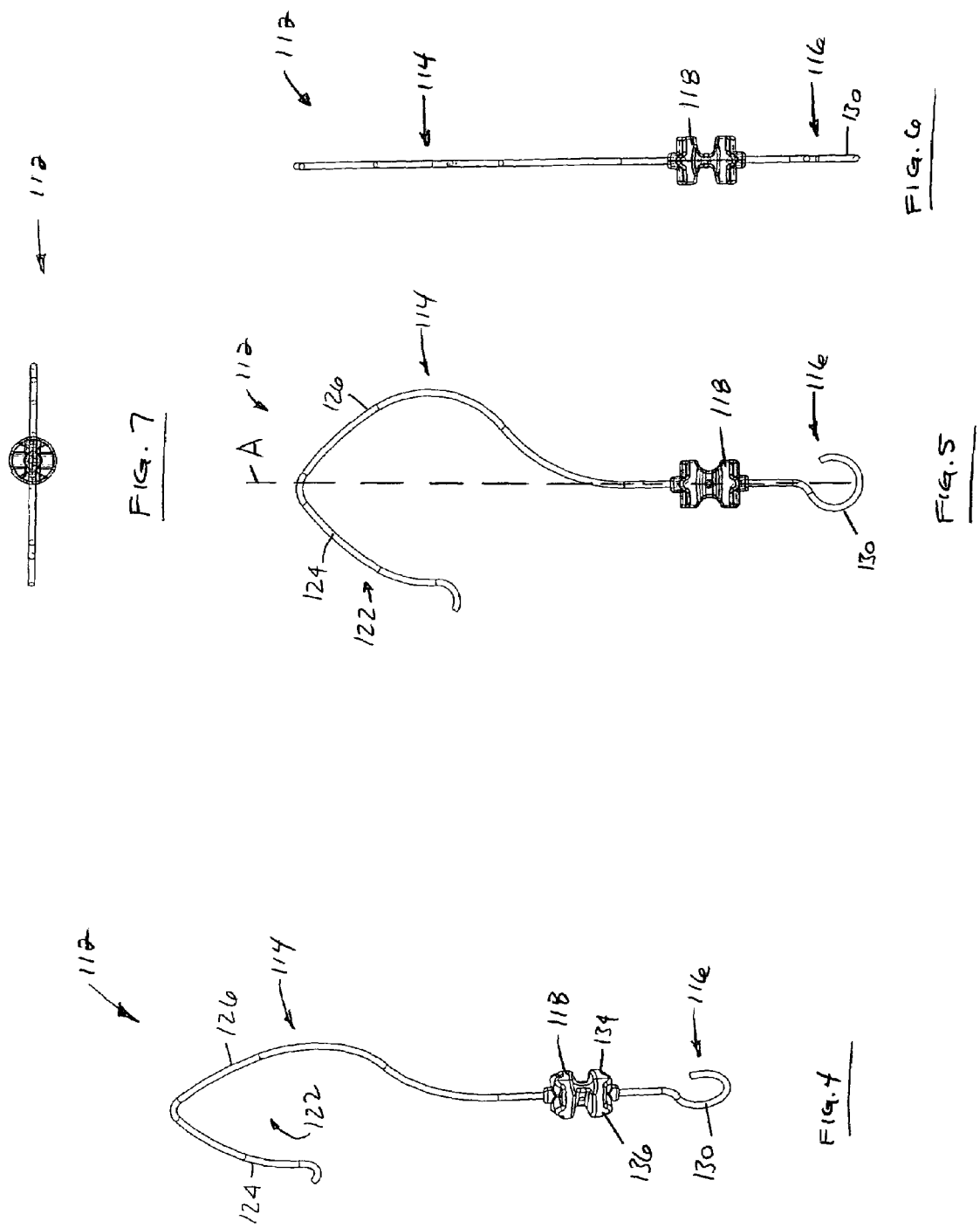

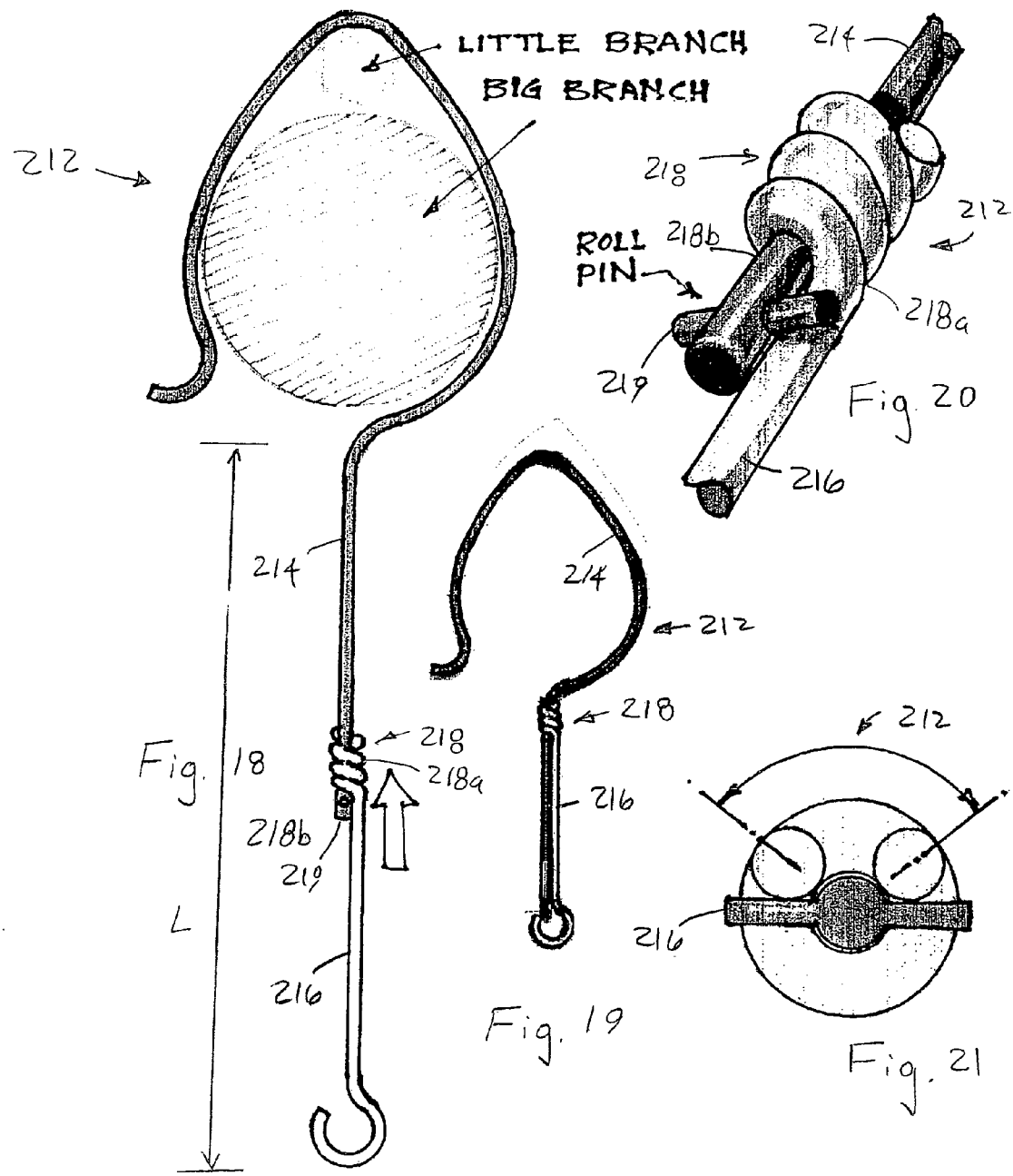

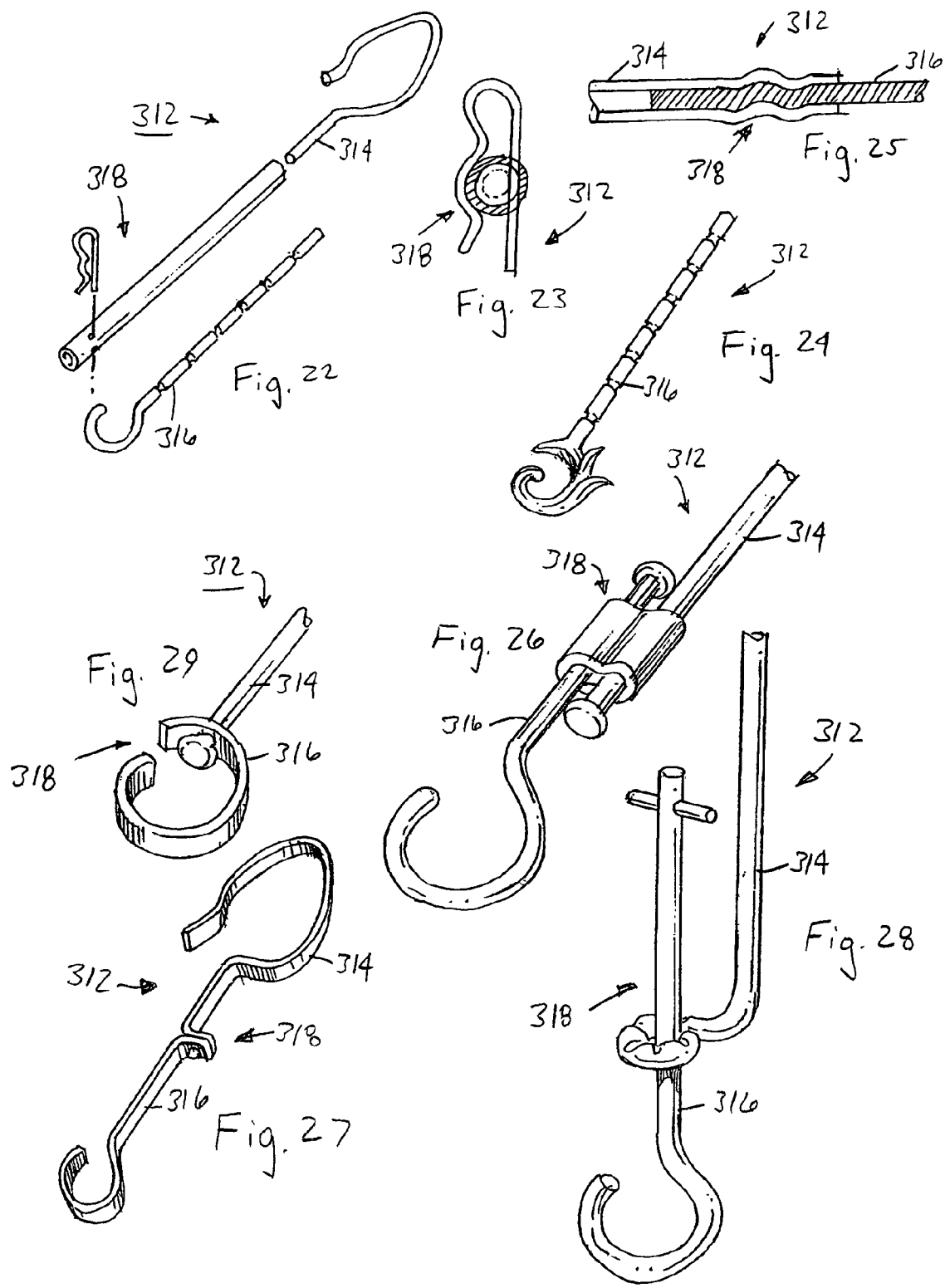

ANIMAL FEEDER, METHOD OF OPERATING A FEEDER, AND METHOD OF ASSEMBLING THE SAME

RELATED APPLICATIONS

The present application claims the benefit of prior-filed, provisional patent application Ser. No. 60/731,318, filed Oct. 28, 2005, the entire contents of which is hereby incorporated by reference. The present application also claims the benefit of prior-filed, provisional patent application Ser. No. 60/800, 794, filed May 16, 2006, the entire contents of which is hereby incorporated by reference.

BACKGROUND

The present invention relates to feeders and, more particularly, to an animal feeder, a method of operating the feeder, and a method of assembling the feeder.

SUMMARY

Some embodiments of the present invention provide a feeder including a housing operable to dispense feed to animals having a first size and operable to prevent animals having a second size from accessing the feed, the second size being greater than the first size.

In addition, some embodiments of the present invention provide an animal feeder and a hanger for supporting the feeder. The animal feeder includes a housing for containing a feed and defining an opening for providing animals access to the feed. The housing also includes a door which is movable relative to the housing between a first position, in which the door substantially covers the opening, and a second position, in which the door is moved away from the opening. The hanger is secured to the housing and is connected to the door for moving the door between the second position and the first position when an animal contacts the hanger.

Some embodiments of the invention also provide an animal feeder including a frame and a first chamber and a second chamber supported in the frame and operable to contain feed. The feeder can also include a locking mechanism moveable relative to the frame between a locked position, in which the locking mechanism secures the first chamber and the second chamber to the frame, and an unlocked position, in which at least one of the first chamber and the second chamber is separable from the frame.

In some embodiments, the locking member includes a first intermediate position, in which the first chamber is movable with respect to the frame and the second chamber is secured to the frame, and a second intermediate position, in which the first chamber is secured to the frame and the second chamber is movable with respect to the frame. In some embodiments, the frame supports a third chamber and the locking mechanism is movable relative to the frame to selectively secure the third chamber to the frame.

In addition, some embodiments of the invention provide a feeder including a chamber for containing feed and having an opening for providing access to the feed. The feeder can also include a door connected to the chamber for movement relative to the chamber between a closed position, in which the door substantially covers the opening, and an opened position, in which the door is moved away from the opening. In some embodiments, at least one of the door and the chamber can be formed of a material having a flavor additive. In some such embodiments, the flavor additive has a bitter taste, and in other such embodiments, the flavor additive has a spicy flavor.

In still other embodiments, the flavor additive is selected so that a first animal is unable to taste the flavor additive and a second animal is repelled by a taste of the flavor additive.

Some embodiments of the invention provide an animal feeder mountable on an exterior support. The animal feeder can include a housing for containing feed and defining an opening for providing access to the feed, a frame having an opening and being supported on the housing for movement relative to the housing between an opened position, in which the opening in the frame and the opening in the housing are substantially aligned, and a closed position, in which the opening in the frame and the opening in the housing are substantially misaligned, and a hanger for supporting the animal feeder. The hanger can include an elongated member extending outwardly from the frame and being connectable to the exterior support, and a sleeve extending across at least a portion of the elongated member, the sleeve being connected to the frame and being operable to move the frame relative to the housing between the first position and the second position, the opening in the frame being spaced a distance of about 18 inches from a distal end of the sleeve.

In addition, some embodiments of the invention provide an animal feeder mountable on an exterior support. The animal feeder can include a housing for containing a feed and defining an opening for providing access to the feed, a frame supported on the housing for movement relative to the housing between a first position, in which the frame substantially covers the opening, and a second position, in which the frame is moved away from the opening, and a hanger for supporting the animal feeder. The hanger can include an elongated member extending outwardly from the frame and being connectable to the exterior support, and a sleeve having a first end connected to one of the housing and the frame, a second end extending across at least a portion of the elongated member, and a length of at least three inches measured between the first end and the second end.

Some embodiments of the invention provide an animal feeder mountable on an exterior support. The animal feeder can include a housing for containing feed and having an upper end and a lower end, the housing defining a first opening and a second opening for providing access to the feed, the first opening and the second opening being spaced between the upper end of the housing and the lower end of the housing, a frame supported on the housing for movement relative to the housing between a first position, in which the frame substantially covers one of the first opening and the second opening, and a second position, in which the frame is moved away from the one of the first opening and the second opening, and a hanger including an elongated member extending outwardly from the frame and being connectable to the exterior support, and a sleeve having a distal end extending outwardly from the frame and across at least a portion of the elongated member, the sleeve being connected to the frame and being operable to move the frame between the first position and the second position. The second opening can be spaced a distance of at least four inches from the lower end of the housing.

Other aspects of the invention will become apparent by consideration of the detailed description and accompanying drawings.

BRIEF DESCRIPTION OF THE DRAWINGS

FIG. 4 is a front perspective view of a hanger according to the present invention.

FIG. 5 is a front view of the hanger of FIG. 4.

FIG. 6 is a side view of the hanger of FIG. 4.

FIG. 7 is a top view of the hanger of FIG. 4.

FIG. 18 is a side view of a hanger according to the present invention, with in a first orientation.

FIG. 19 is another side view of the hanger shown in FIG. 18 in a second orientation.

FIG. 20 is an enlarged perspective view of the hanger shown in FIG. 18.

FIG. 21 is an bottom view of the hanger shown in FIG. 18.

FIG. 22 is an exploded perspective view of a hanger according to an embodiment of the present invention.

FIG. 23 is an enlarged view of a portion of the hanger shown in FIG. 22.

FIG. 24 is a perspective view of an alternate embodiment of a portion of the hanger shown in FIG. 22.

FIG. 25 is a cross-sectional view of a portion of the hanger shown in FIG. 22.

FIG. 26 is a perspective view of a hanger according to an embodiment of the present invention.

FIG. 27 is a perspective view of a hanger according to an embodiment of the present invention.

FIG. 28 is a perspective view of a hanger according to an embodiment of the present invention.

FIG. 29 is a perspective view of a hanger according to an embodiment of the present invention.

Figure 1:
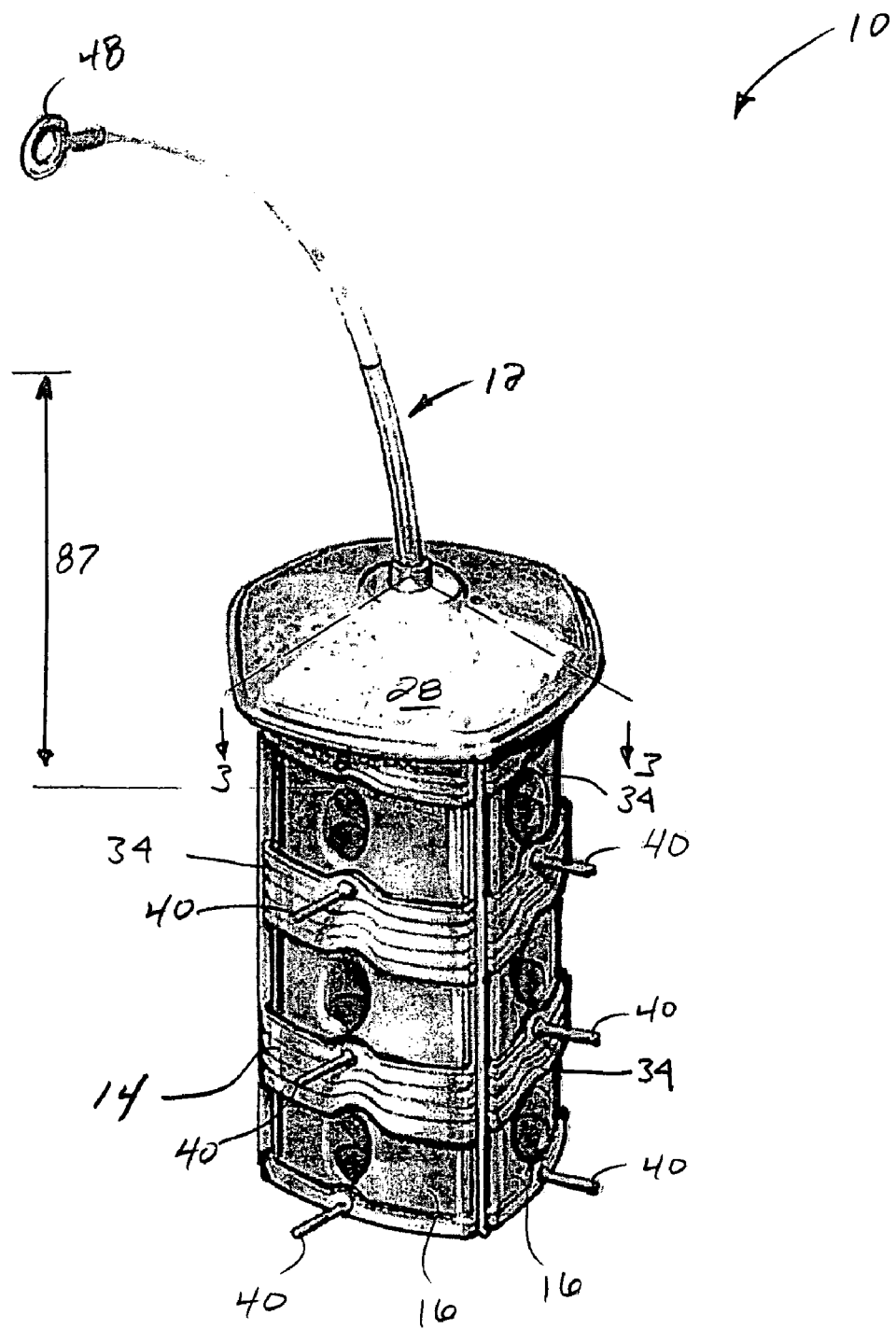
FIG. 1 is a front perspective view of an animal feeder according to the present invention.

Before the various embodiments of the present invention are explained in detail, it is to be understood that the invention is not limited in its application to the details of construction and the arrangements of components set forth in the following description or illustrated in the drawings. The invention is capable of other embodiments and of being practiced or of being carried out in various ways. Also, it is to be understood that phraseology and terminology used herein with reference to device or element orientation (such as, for example, terms like "top," "side", "upper," "lower," "front," and the like) are only used to simplify description of the present invention, and do not alone indicate or imply that the device or element referred to must have a particular orientation. The elements of the feeder and hanger referred to in the present invention can be installed and operated in any orientation desired. In addition, terms such as "first," "second," and "third" are used herein for purposes of description and are not intended to indicate or imply relative importance or significance.

Also, the use of "including," "comprising," or "having" and variations thereof herein is meant to encompass the items listed thereafter and equivalents thereof as well as additional items. Unless specified or limited otherwise, the terms "mounted," "connected," "supported," and "coupled" and variations thereof are used broadly and encompass both direct and indirect mountings, connections, supports, and couplings. Further, "connected" and "coupled" are not restricted to physical or mechanical connections or couplings.

DETAILED DESCRIPTION

Figure 2:
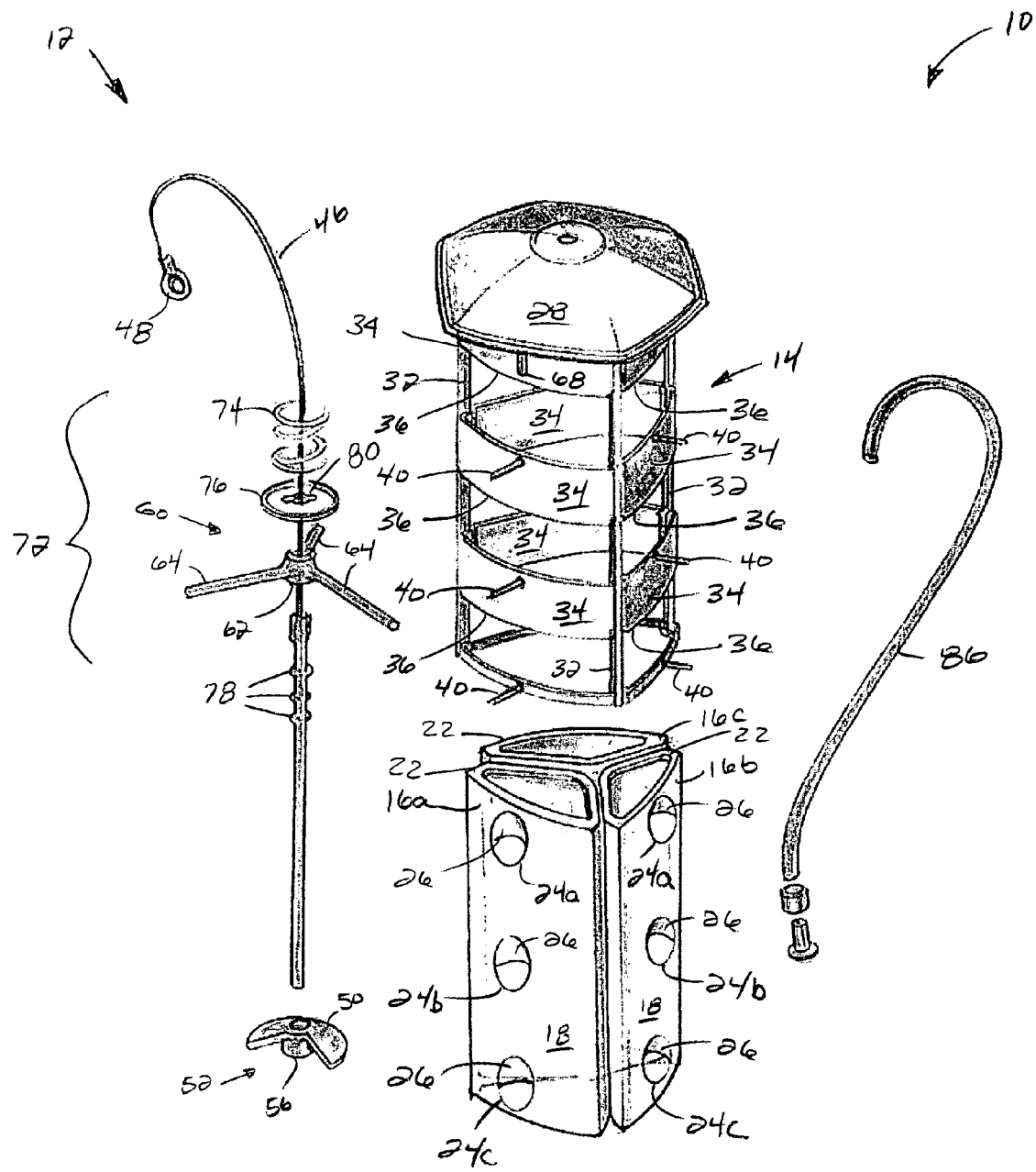
FIG. 2 is a partially exploded perspective view of the animal feeder of FIG. 1.
Figure 3:
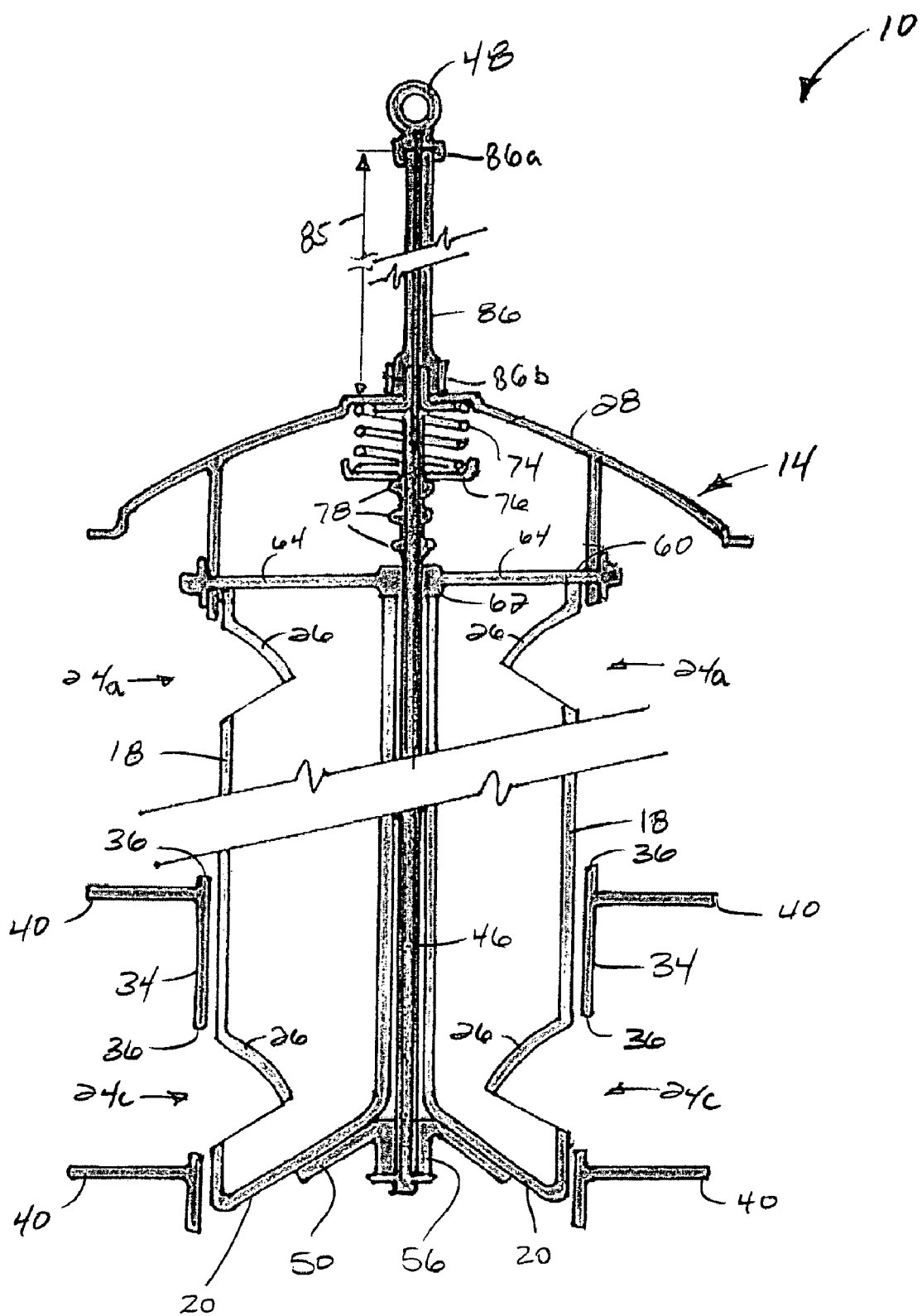
FIG. 3 is a section view of the animal feeder taken along line 3-3 of FIG. 1.
Figure 10:
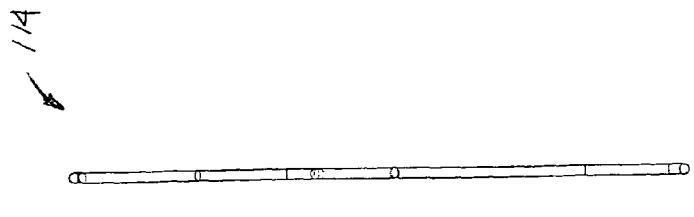
FIG. 10 is a side view of the first portion of the hanger of FIG. 4.
Figure 9:
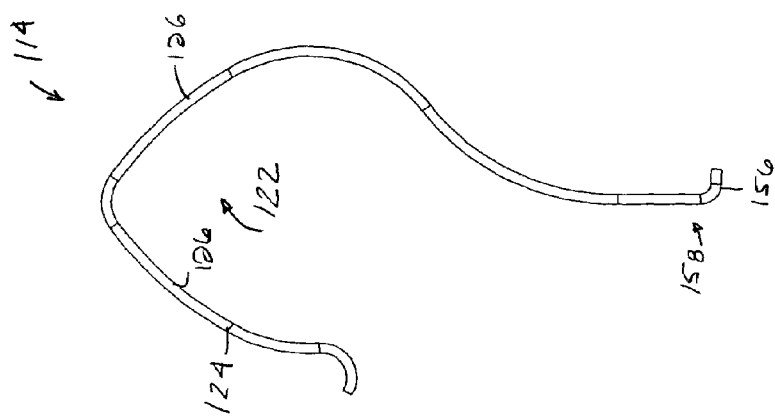
FIG. 9 is a front view of a first portion of the hanger of FIG. 4.
Figure 8:
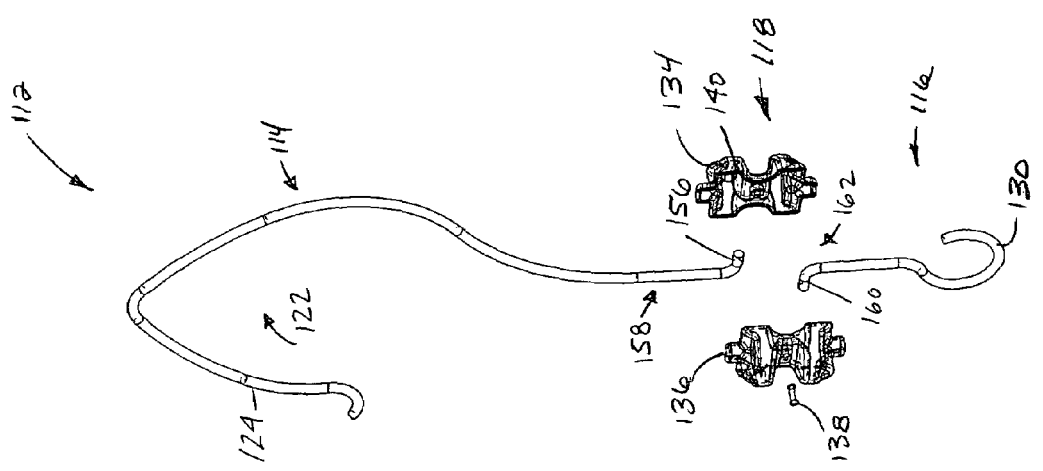
FIG. 8 is an exploded perspective view of the hanger of FIG. 4.
Figure 12:
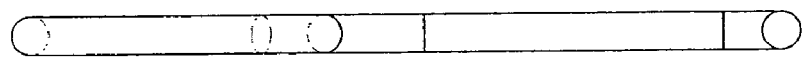
FIG. 12 is a side view of the second portion of the hanger of FIG. 4.
Figure 11:
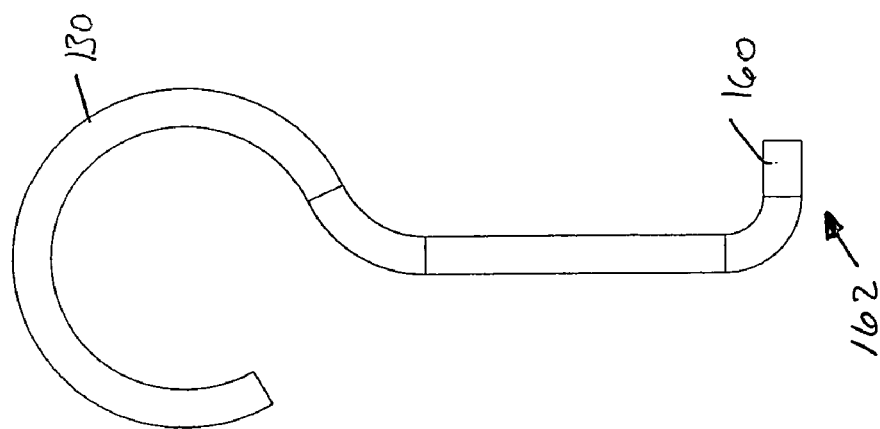
FIG. 11 is a front view of a second portion of the hanger of FIG. 4.
Figure 16:
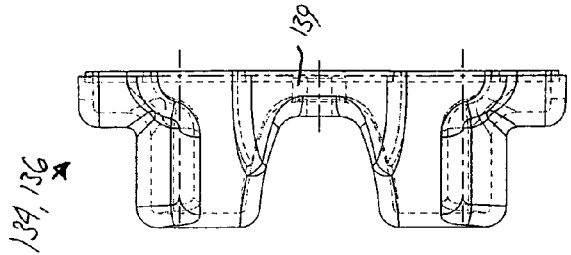
FIG. 16 is a side view of the third portion of the hanger of FIG. 4.
Figure 13:
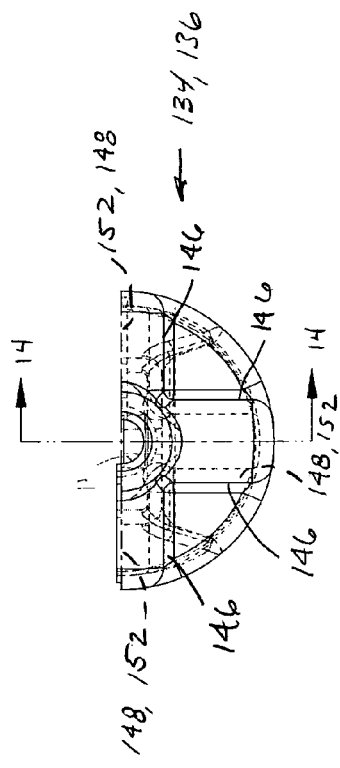
FIG. 13 is a top view of a third portion of the hanger of FIG. 4.
Figure 15:
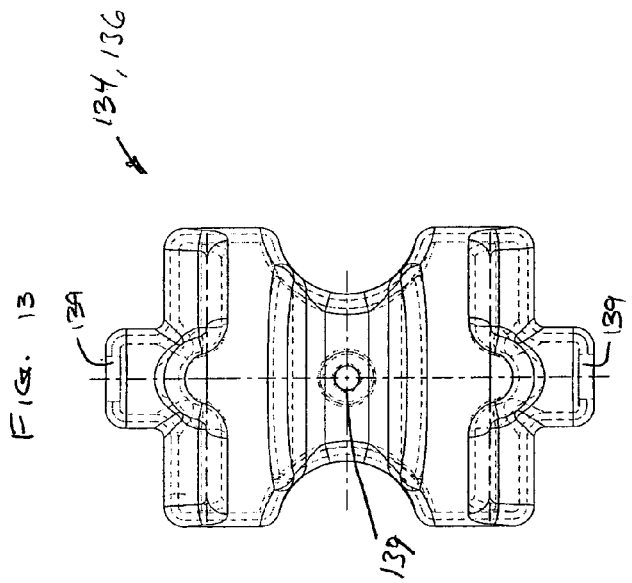
FIG. 15 is a front view of the third portion of the hanger of FIG. 4.
Figure 14:
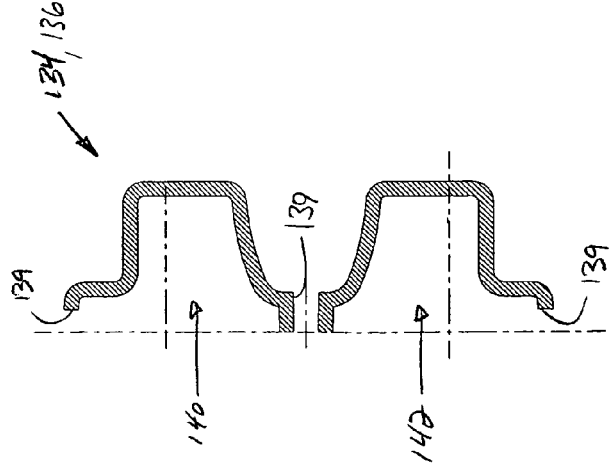
FIG. 14 is a section view of the third portion of the hanger taken along line 14-14 of FIG. 13.
Figure 17:
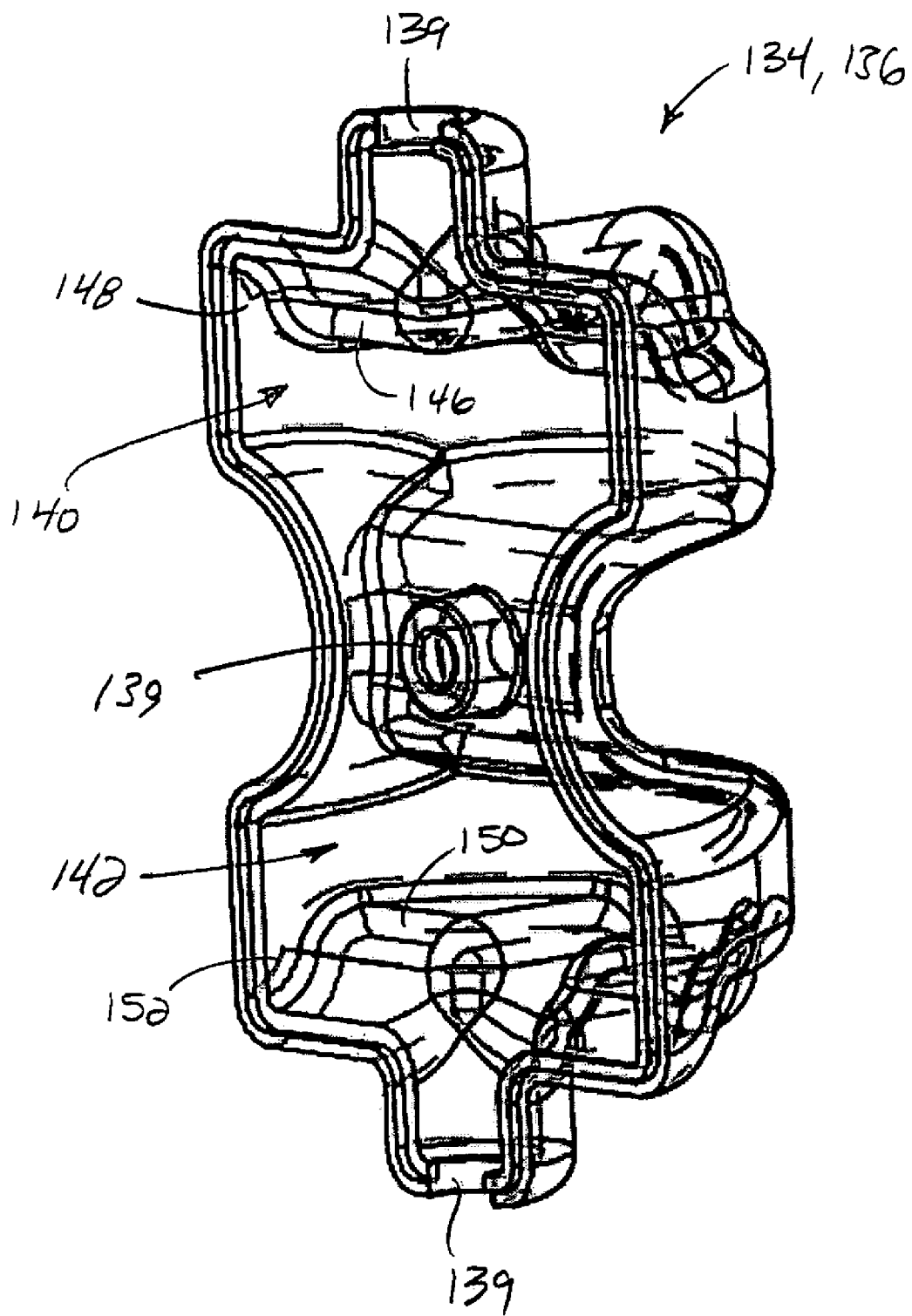
FIG. 17 is a perspective view of the third portion of the hanger of FIG. 4.

FIGS. 1-3 illustrate an animal feeder 10 and a hanger 12 according to some embodiments of the present invention. The feeder 10 includes a cage or frame 14 and chambers or feed bins 16 selectively supported in the frame 14 for housing animal feed.

In the illustrated embodiment of FIGS. 1-3, the feeder 10 includes first, second, and third chambers 16a, 16b, 16c, each of which can house a different animal feed to provide animals with a variety of feed choices. Alternatively, each of the first, second, and third chambers 16a, 16b, 16c can house a feed intended for a different animal.

As shown in FIG. 2, the first, second, and third chambers 16a, 16b, 16c each have a generally triangular cross-sectional shape. In other embodiments, the first, second, and third chambers 16a, 16b, 16c can have any other cross-sectional shape desired, such as, for example, a circular, rectangular, or other polygonal shape, an irregular shape, and the like. Other embodiments can include one, two, four, or more chambers 16, each of which can be movably supported in the frame 14.

In the illustrated embodiment of FIGS. 1-3, the first, second, and third chambers 16a, 16b, 16c are formed from transparent or semi-transparent plastic material so that animals can view the feed contained in the first, second, and third chambers 16a, 16b, 16c. In other embodiments, the first, second, and third chambers 16a, 16b, 16c can be formed from other materials, such as, for example, metal, wood, glass, and composites. These other materials can be transparent, translucent, and/or opaque.

Each of the first, second, and third chambers 16a, 16b, 16c can include tracks or other inter-engaging elements (not shown) for removably interconnecting the first, second, and third chambers 16a, 16b, 16c. Alternatively or in addition, other fasteners, such as, for example, screws, nails, rivets, pins, posts, clips, clamps, and any combination of such fasteners can also be used to hold the first, second, and third chambers 16a, 16b, 16c together within the frame 14. In some embodiments, a single chamber may include one or more partitions to divide the chamber into a plurality of smaller chambers.

In the illustrated embodiment of FIGS. 1-3, the first, second, and third chambers 16a, 16b, 16c each include sidewalls 18, a closed bottom end 20, an open top end 22, and a number of openings 24 spaced along the sidewalls 18 for providing access to the interior of the first, second, and third chambers 16a, 16b, 16c. In such embodiments, the open top end 22 facilitates refilling and cleaning of the first, second, and third chambers 16a, 16b, 16c.

In some embodiments, such as the illustrated embodiment of FIGS. 1-3, openings 24a, 24b, 24c are equally spaced along the length of the first, second, and third chambers 16a, 16b, 16c between upper and lower ends of the first, second, and third chambers 16a, 16b, 16c. In some embodiments, the upper-most openings 24 are positioned between about one inches and about five inches from the top ends 22 of the first, second, and third chambers 16a, 16b, 16c and the bottom-most openings 24 are positioned between about one inches and about five inches from the bottom ends 20 of the first, second, and third chambers 16a, 16b, 16c. In addition, intermediate openings 24 can be positioned at least five inches from the bottom ends 20 of the first, second, and third chambers 16a, 16b, 16c.

As explained in greater detail below, the hanger 12 of the present design prevents undesirable animals from feeding from the feeder 10, while allowing the feeder 10 to be relatively small in size. Similarly, the hanger 12 of the present invention allows openings 24 to be positioned along the length of each of the first, second, and third chambers 16a, 16b, 16c between the top and bottom ends 22, 22, while allowing the feeder 10 to be relatively small in size and also preventing undesirable animals from feeding from the feeder 10.

As shown in FIG. 3, in some embodiments, hoods 26 extend inwardly from the side wall 18 toward the interior of the first, second, and third chambers 16a, 16b, 16c above each of the openings 20. In these embodiments, the hoods 26 can prevent feed from spilling out of the first, second, and third chambers 16a, 16b, 16c when the chambers 16a, 16b, 16c are filled with feed.

In some embodiments, such as the illustrated embodiment of FIGS. 1-3, the frame 14 can include a roof or cover 28, downwardly extending legs 32, side members or doors 34 extending between the legs 32, and openings 36 defined between the legs 32 and the doors 34. As shown in FIGS. 1-3, the frame 14 can also include perches 40 or other outwardly extending protrusions for supporting animals while the animals feed. In some embodiments, the feeder 10 can be suspended to allow taller animals such as deer to feed from the ground while shorter animals would be unable to reach the feeder 10 from the ground.

In the illustrated embodiment, the hanger 12 includes an elongated member 46 for supporting the feeder 10 under a branch or overhang. In some embodiments, such as the illustrated embodiment of FIGS. 1-3, at least a portion of the elongated member 46 is a flexible member and can be formed of string, cable, twine, an elastomeric material, and the like. In other embodiments, the elongated member 46 or a portion of the elongated member 46 can be a rigid member, such as, for example, a rod, rigid shaft, or wire. The hanger 12 can also include a hook or a loop 48 secured to an upper end of the elongated member 46 for securing the feeder 10 to a branch or overhang.

A lower end of the elongated member 46 can be secured to a locking element or locking tab 50. As shown in FIGS. 1-3, the locking tab 50 has a generally circular shape and includes a notch 52. In the illustrated embodiment, the notch 52 extends across approximately 120 degrees of the circumference of the locking tab 50. In other embodiments, the locking tab 50 and the notch 52 can have other shapes, orientations, and relative sizes.

In the illustrated embodiment of FIGS. 1-3, the locking tab 50 is rotatable about an axis of the elongated member 46 and is movable relative to the elongated member 46, the first, second, and third chambers 16a, 16b, 16c, and the frame 14 between a locked position and unlocked positions. In the locked position, the locking tab 50 extends across the first, second, and third chambers 16a, 16b, 16c and the notch 52 is misaligned with each of the first, second, and third chambers 16a, 16b, 16c to secure the first, second, and third chambers 16a, 16b, 16c to the elongated member 46 and the frame 14. In the unlocked positions, the locking tab 50 is moved relative to the first, second, and third chambers 16a, 16b, 16c and the notch 52 is moved into alignment with one of the first, second, and third chambers 16a, 16b, 16c so that the selected chamber can be removed from the frame 14 for cleaning or filling.

The locking tab 50 can also include an actuator 56 for moving the locking tab 50 between the locked and unlocked positions. In the illustrated embodiment of FIGS. 2 and 3, the actuator 56 extends downwardly from the locking tab 50 for engagement between an operator's fingers. In other embodiments, the locking tab 50 and the actuator 56 can have other orientations and shapes.

As shown in FIGS. 1-3, the hanger 12 includes a flange 60 for supporting the elongated member 46 and the first, second, and third chambers 16a, 16b, 16c in the frame 14. In the illustrated embodiment, the flange 60 includes a central support 62 and three arms 64 extending outwardly from the central support 62. As shown in FIGS. 2 and 3, the elongated member 46 extends through the central support 62 and is prevented from moving laterally with respect to the frame 14.

In the illustrated embodiment of FIGS. 1-3, the arms 64 extend outwardly through slots 68 in the frame 14 to facilitate movement of the frame 14 and the flange 60 relative to the first, second, and third chambers 16a, 16b, 16c along the axis of the elongated member 46.

The feeder 12 can also include a biasing assembly 72 supported on the elongated member 46. In the illustrated embodiment of FIGS. 1-3, the biasing assembly 72 includes an elastic member 74 (e.g., a spring) and a collar 76 for supporting the elastic member 74 in the feeder 10.

As shown in FIGS. 1-3, the collar 76 can be supported on the elongated member 46. In some embodiments, such as the illustrated embodiment, the collar 76 can be secured to the elongated member 46 in two or more positions and can be moved between the positions to adjust the spring force applied to the frame 14 by the elastic member 74. In these embodiments, the elongated member 46 can have two or more outwardly extending protrusions 78 and the collar 76 can include an opening 80 for selectively engaging each of the protrusions 78.

In the illustrated embodiment, the elastic member 74 is a compression spring positioned between an underside of the roof 28 and an upper side of the collar 76. The elasticity and the spring constant of the elastic member 74 are selected to maintain the frame 14 in a first position with respect to the chambers 16. More particularly, as shown in FIGS. 1 and 3, when the frame 14 is in the first position, the openings 34 of the frame 14 are substantially aligned with the openings 24 in the first, second, and third chambers 16a, 16b, 16c so that an animal can access food in the first, second, and third chambers 16a, 16b, 16c through the openings 24, 34. The elasticity and the spring constant of the elastic member 74 are also selected so that when a first predetermined mass (e.g., the mass of a rodent or other mammal or a crow or other large bird) is applied to the frame 14, the elastic member 74 is compressed and the frame 14 is moved toward a second position in which the openings 34 of the frame 14 are substantially misaligned with the openings 24 in the first, second, and third chambers 16a, 16b, 16c so that animals are prevented from accessing food in the first, second, and third chambers 16a, 16b, 16c through the openings 24, 34. The elasticity of the elastic member 74 can also be selected so that when a second mass (e.g., the mass of a songbird) is applied to the frame 14, the elastic member 74 is not compressed and the frame 14 is maintained in the first position.

In embodiments such as the illustrated embodiment of FIGS. 1-3 having two or more protrusions 78 positioned along the elongated member 46, the collar 76 can be moved along the elongated member 46 to adjust the elastic member 74 so that substantially larger, or alternatively, substantially smaller masses are required to move the frame 14 between the first position and the second position.

In some embodiments, such as the illustrated embodiment of FIGS. 1-3, the hanger 12 can include a sleeve 86 supported on the elongated member 46 and extending between the hook 48 and the roof 28. In other embodiments, the sleeve 86 can extend along the elongated member 46 between less than the entire length between the hook 48 and the roof 28. In yet other embodiments, the sleeve 86 can have a length of at least 3 inches to 4 inches.

As explained below, in embodiments having a hanger 12, such as the illustrated embodiment of FIGS. 1-3, the length of the sleeve 86 can be inversely proportional to the height of the first, second, and third chambers 16a, 16b, 16c and/or the height of the frame 14. More particularly, in such embodiments, a sleeve 86 having a relatively large length prevents squirrels, chipmunks, and other small animals from feeding from the feeder 10, while allowing at least one of the first, second, and third chambers 16a, 16b, 16c and the frame 14 to have a relatively small overall size and/or height.

As shown in FIGS. 2 and 3, a lower end of the sleeve 86 can be secured to the roof 28 and the sleeve 86 can be supported on the elongated member 46 for movement along the length of the elongated member 46. In some embodiments, the sleeve 86 can be secured to the sides or tops of the first, second, and third chambers 16a, 16b, 16c.

In operation, when an animal contacts the sleeve 86, the mass of the animal applies a downward force to the roof 28, causing the sleeve 86 and the frame 14 to move downwardly with respect to the first, second, and third chambers 16a, 16b, 16c toward the second position. As explained above, when the frame 14 is in the second position, the openings 34 of the frame 14 are substantially misaligned with the openings 24 in the first, second, and third chambers 16a, 16b, 16c so that animals are prevented from accessing food in the first, second, and third chambers 16a, 16b, 16c through the openings 24, 34.

In some embodiments, the distance 87 (FIG. 1) between the top of the sleeve 86 and the closest aperture 24a is between about 18.5 inches and about 21.0 inches to prevent animals from clinging to the elongated member 46 above the sleeve 86 and reaching any of the apertures 24a, 24b, 24c. This distance 87 is also sufficient to prevent animals from reaching the feeder 10 from a branch or overhang that supports the feeder 10.

As mentioned above, the length of the sleeve 86 can be inversely proportional to the height of the first, second, and third chambers 16a, 16b, 16c and/or the height of the frame 14 and the distance 87 between the top of the sleeve 86 and the closest aperture 24 can be between about 18.5 inches and about 21 inches. Accordingly, in embodiments in which chambers 16a, 16b, 16c having relatively short heights are used, a sleeve 86 having a relatively large height can be used to prevent undesirable animals from accessing the feed. Similarly, in embodiments in which chambers 16a, 16b, 16c having relatively larger lengths are used, a sleeve 86 having a relatively small height can be used. In addition, in embodiments, such as the illustrated embodiment of FIGS. 1-3, in which openings 24 are spaced along the height of the chambers 16a, 16b, 16c, a sleeve 86 having a relatively large length can be used to prevent undesirable animals from accessing the feed.

In some embodiments of the present invention, one or more elements of the feeder 10, such as, for example, the frame 14, the sleeve 86, and the first, second, and third chambers 16a, 16b, 16c can be formed from a material including a flavor additive. In some such embodiments, the additive can be mixed with a plastic material during forming of the element of the feeder 10. In these embodiments, the element of the feeder 10 can be formed of a molded plastic material having an additive.

In some embodiments, additives having a bitter taste are used. In other embodiments, additives having a pepper or spicy flavor are used. In still other embodiments, other additives, including poisons, are added prior to or during forming of the elements of the feeder 10. In these embodiments, the additive is selected to repel selected animals and to not repel other animals. For example, in some embodiments, the frame 14 is formed with an additive selected to repel mammals and to not repel birds. In some such embodiments, the additive is added in relatively small volumes so that animals are unable to taste the additive unless the animal scratches, claws, or chews on the element of the feeder 10 to expose the additive.

Alternatively or in addition, one or more of the elements of the feeder 10 can be formed from or at least partially covered (e.g., painted, finished, glazed, brazed, etc.) with materials having bacteria-inhibiting properties. In some such embodiments, the inclusion of bacteria-inhibiting materials substantially prevents the growth of microorganisms (e.g., e-coli, bird flu, and the like) on the feeder 10 or portions of the feeder 10, thereby preventing or minimizing the transmission of microorganisms between animals and/or preventing or minimizing the transmission of microorganisms between animals and humans during cleaning and filling of the feeder 10.

FIGS. 4-16 illustrate a hanger 112 according to an alternative embodiment of the present invention. In some embodiments, the hanger 112 is operable to support an animal feeder on a tree or an overhang. In other embodiments, the hanger 112 can be used to support other hanging decorations (e.g., ornaments, lights, etc.) on a tree or an overhang.

As shown in FIGS. 4-16, the hanger 112 includes a first body 114, a second body 116 and a connector 118 for connecting the first body 114 to the second body 116 and for facilitating movement of the first body 114 with respect to the second body 116.

In the illustrated embodiment of FIGS. 4-16, the first body 114 is a generally elongated member having a substantially circular cross-sectional shape. In other embodiments, the first body 114 can have other cross-sectional shapes, such as, for example, a triangular, rectangular, trapezoidal, or any other polygonal shape, or any other regular or irregular shape.

In some embodiments, an upper end of the first body 114 can be shaped to form a substantially V-shaped hook 122. In the illustrated embodiment, a first leg 124 of the hook 112 is oriented at an angle of between about 80 degrees and about 90 degrees with respect to a second leg 126 of the hook 112. In these embodiments, the hook 122 is shaped so that interior sides of the first leg 124 and the second leg 126 engage opposite sides of a branch to support the hanger 112 (and a feeder or another decoration supported by the hanger 112) on a branch and to prevent the hanger 112 (and the feeder or the other decoration supported by the hanger 112) from moving with respect to the branch. More particularly, the engagement between the branch and the interior sides of the first leg 124 and the second leg 126 prevent the hanger 112 from pivoting about an axis A with respect to the branch.

In embodiments in which the hook 112 is substantially V-shaped, the interior sides of the first and second legs 124, 126 engage opposite sides of branches having a number of different sizes. In this manner, the hook 112 can non-movably engage a first branch having a first width and can non-movably engage a second branch having a second, different width.

As shown in FIGS. 4-16, the second body 116 can include a hook or a loop 130 for supporting a feeder or another decoration. As also shown in FIGS. 4-16, the connector 118 is positioned between the first and second bodies 114, 116.

In the illustrated embodiment, the connector 118 includes a first connector body 134 and a second connector body 136 and a fastener 138 for removably securing the first connector body 134 to the second connector body 136. As shown in FIGS. 4-16, the fastener 138 is insertable through openings 139 in the first and second connector bodies 134,136. In some embodiments, the fastener 138 is a threaded fastener, such as, for example, a screw. In other embodiments, other fasteners, such as, for example, pins, adhesives, and other conventional fasteners, magnets, clips, brackets, and hook and loop fastener material can be used to connect the first and second connector bodies 134, 136.

As shown in FIGS. 8 and 14-17, the connector 118 includes an upper chamber 140 and a lower chamber 142. Ribs 146 of the first and second connector bodies 134, 136 define a number of cavities 148 circumferentially spaced around the upper chamber 140. Ribs 150 of the first and second connector bodies 134, 136 define a number of cavities 152 circumferentially spaced around the lower chamber 142.

In the illustrated embodiment, an arm 156 extends radially outwardly from a lower end 158 of the first body 114 and is selectively engageable in one of the cavities 148 of the upper chamber 140 to secure the first body 114 to the connector 118. An arm 160 extends radially outwardly from an upper end 162 of the second body 116 and is selectively engageable in one of the cavities 152 of the lower chamber 142 to secure the second body 116 to the connector 118.

In operation, an operator secures the first body 114 to the connector 118 and secures the second body to the connector 118 and hangs the hanger 112 on a tree or an overhang. The operator then connects a decoration or a feeder to the hook 130 of the second body 116. The operator can then readjust the hanger 112 so that the feeder or decoration is facing in a desired direction with respect to the tree or the overhang. More specifically, the operator can reorient the hanger 112 so that a predetermined side of the feeder or decoration is facing in a desired direction with respect to the tree or overhang.

To adjust the hanger 112, the operator removes the fastener 138 from the first and second connector bodies 134, 136 and moves the arm 156 of the first body 114 from one cavity 148 of the upper chamber 140 to another cavity 148 of the upper chamber 140. Alternatively or in addition, the operator can move the arm 160 of the second body 116 from a cavity 152 of the lower chamber 142 to another cavity 152 of the lower chamber 142. As mentioned above, the cavities 148 of the upper chamber 140 and the cavities 152 of the lower chamber 142 are spaced circumfererentially around the respective upper and lower chambers 140, 142 and have different relative orientations. Once the operator has adjusted the hanger 112, the operator can re-hang the hanger 112 and the decoration from the tree or overhang so that the predetermined side of the feeder or decoration is facing in the desired direction with respect to the tree or overhang.

FIGS. 18-21 illustrate a hanger 212 according to another alternative embodiment of the present invention. As shown in FIGS. 18-19, the hanger 212 includes a first body 214, a second body 216, and a connecting arrangement 218 for connecting the first body 214 to the second body 216 and for facilitating movement of the first body 214 with respect to the second body 216 to adjust an axial length L of the hanger 212. In embodiments, such as the illustrated embodiment of FIGS. 18-21 having a connecting arrangement 218, the length L of the hanger 212 can be adjusted for shipping and packaging.

In the illustrated embodiment of FIGS. 18-21, the connecting arrangement 218 includes an upper end 218a of the second body 216 wound helically around a lower end 218b of the first body 214 for facilitating telescoping movement of the second body 216 along the length of the first body 14. As shown in FIGS. 18 and 20, the connecting arrangement 218 can also include a locking pin 219 for limiting telescoping movement of the second body 216 relative to the first body 214 and for preventing the first and second bodies 214, 216 from being separated.

As shown in FIGS. 18-21, the first body 214 can have a substantially circular cross-sectional shape to facilitate telescoping movement of the second body 216 relative to the first body 214. In other embodiments, the first body 214 can have other cross-sectional shapes, such as, for example, rectangular, oval, polygonal, irregular, etc. In embodiments, such as the illustrated embodiment of FIGS. 18-21, the second body 216 can be pivoted relative to the first body 214 to facilitate packaging and shipping of the hanger 212.

FIGS. 22-29 illustrate hangers 312 according to alternate embodiments of the present invention. As shown in FIGS. 22-29, each of the hangers 312 can include a first body 314 and a second body 316 connected to the first body 314 for sliding movement relative to the first body 314 to change the length of each of the hangers 312. In some of the illustrated embodiments, the hangers 312 also include connecting arrangements 318 for facilitating movement of the first bodies 314 with respect to the second bodies 316.

The embodiments described above and illustrated in the figures are presented by way of example only and are not intended as a limitation upon the concepts and principles of the present invention.

What is claimed is:

1. An animal feeder mountable on an exterior support, the animal feeder comprising:
   a housing for containing feed and defining a plurality of openings for providing access to the feed, the plurality of openings being substantially equally spaced between an upper end of the housing and a lower end of the housing, at least one of the plurality of openings being positioned proximate the upper end of the housing when the feeder is mounted on the support;
   a frame having an opening and being supported on the housing for movement relative to the housing between an opened position, in which the opening in the frame and at least one of the plurality of openings in the housing are substantially aligned, and a closed position, in which the opening in the frame and the at least one of the plurality of openings in the housing are substantially misaligned; and
   a hanger for supporting the animal feeder, including
      an elongated member extending outwardly from the housing through the frame and being connectable to the exterior support such that the frame is moveable with respect to the elongated member, and
      a sleeve sheathing at least a portion of the elongated member, the sleeve being connected to the frame and extending outward from the frame in the direction of the exterior support, the sleeve being operable to move the frame relative to the housing between the opened position and the closed position.

2. The animal feeder of claim 1, wherein the opening in the frame is spaced a distance of at least 18.5 inches from a distal end of the sleeve.

3. The animal feeder of claim 2, wherein the distance between the opening in the frame and the distal end of the sleeve is between about 18.5 inches and about 21.0 inches.

4. The animal feeder of claim 1, wherein the at least one of the plurality of openings in the housing is positioned between about one inch and about five inches from the upper end of the housing.

5. The animal feeder of claim 1, wherein the at least one of the plurality of openings in the housing is positioned at least five inches from the lower end.

6. The animal feeder of claim 1, wherein the at least one of the plurality of openings is positioned adjacent to the upper end of the housing.

7. The animal feeder of claim 1, wherein the sleeve includes a proximal end connected to the frame, and wherein the sleeve has a length of at least three inches measured between a distal end and a proximal end.

8. An animal feeder mountable on an exterior support, the animal feeder comprising:
   a housing for containing a feed and defining an opening in a sidewall for providing access to the feed;
   a frame supported on the housing for movement relative to the housing between a first position, in which the frame substantially covers the opening, and a second position, in which the frame is moved away from the opening; and
   a hanger for supporting the animal feeder, the hanger including
      an elongated member extending outwardly from the housing through the frame and being connectable to the exterior support, and
      a sleeve having a first end connected to one of the housing and the frame, a second end extending in a direction toward the exterior support and sheathing at least a portion of the elongated member, and a length of at least three inches measured between the first end and the second end;
   wherein the sleeve is operable to move the frame relative to the housing between the first position and the second position.

9. The animal feeder of claim 8, wherein the length is about six inches.

10. The animal feeder of claim 8, wherein the first end of the sleeve is connected to the frame.

11. The animal feeder of claim 8, wherein the frame includes an opening, and wherein the opening in the frame is spaced a distance of about 18.5 inches from the second end of the sleeve.

12. The animal feeder of claim 8, wherein the frame includes an opening, and wherein a distance between the opening in the frame and the second end of the sleeve is between about 18.5 inches and about 21.0 inches.

13. The animal feeder of claim 8, wherein the housing includes an upper end, and wherein the opening in the housing is positioned between about one inch and about five inches from the upper end of the housing.

14. The animal feeder of claim 8, wherein the housing includes an upper end, wherein the opening in the housing is a first opening, wherein the housing includes a second opening positioned between the first opening and the upper end of the housing and providing access to the feed.

15. The animal feeder of claim 8, wherein the opening in the housing is a first opening, wherein the housing includes a second opening providing access to the feed, wherein the housing includes a lower end, and wherein the second opening is positioned at least five inches from the lower end.

16. The animal feeder of claim 15, wherein, when the frame is moved relative to the housing toward the first position, the frame substantially covers the first opening and the second opening and, when the frame is moved toward the second position, the frame is moved away from the first opening and the second opening.

17. The animal feeder of claim 15, wherein the housing includes an upper end, and wherein the second opening in the housing is positioned adjacent to the upper end of the housing.

18. The animal feeder of claim 8, wherein the housing includes a plurality of openings for providing access to the feed, the openings being substantially equally spaced between an upper end of the housing and a lower end of the housing.

19. An animal feeder mountable on an exterior support, the animal feeder comprising:
   a housing for containing feed and having an upper end and a lower end, the housing defining a first opening and a second opening for providing access to the feed, the first opening being positioned between the upper end of the housing and the lower end of the housing, the second opening being adjacent the upper end of the housing;
   a frame supported on the housing for movement relative to the housing between a first position, in which the frame substantially covers one of the first opening and the second opening, and a second position, in which the frame is moved away from the one of the first opening and the second opening; and
   a hanger including
      an elongated member extending outwardly from the housing through the frame and being connectable to the exterior support,
      a sleeve having a distal end extending outwardly from the frame toward the exterior support and sheathing at least a portion of the elongated member, the sleeve being connected to the frame and being operable to move the frame between the first position and the second position.

20. The animal feeder of claim 19, wherein the second opening is spaced a distance of about one inch from the upper end of the housing.

21. The animal feeder of claim 19, wherein the second opening is spaced a distance of about four inches from the upper end of the housing.

22. The animal feeder of claim 19, wherein the sleeve includes a proximal end connected to the frame, and wherein the sleeve has a length of at least three inches measured between the distal end and the proximal end.

23. The animal feeder of claim 19, wherein an opening in the frame is spaced a distance of about 18.5 inches from the distal end of the sleeve.

24. The animal feeder of claim 19, wherein the distance between the frame and the distal end of the sleeve is between about 18.5 inches and about 21.0 inches.

25. The animal feeder of claim 19, wherein the first opening is positioned between about one inch and about five inches from the upper end of the housing.

26. The animal feeder of claim 19, wherein the housing includes a third opening for providing access to the feed, and wherein the first opening, the second opening, and the third opening are substantially equally spaced between the upper end and the lower end of the housing.

27. An animal feeder mountable on an exterior support, the animal feeder comprising:
   a housing having a plurality of chambers for containing feed and an upper end and a lower end, the housing defining a plurality of openings for providing access to the feed, the plurality of openings being substantially equally spaced between the upper end and the lower end;

a frame supported on the housing for movement relative to the housing between a first position, in which the frame substantially covers the plurality of openings, and a second position, in which the frame is moved away from at least one of the plurality of openings;

a hanger including an elongated member extending outwardly from the housing and being connectable to the exterior support, and a sleeve having a distal end extending outwardly from the frame and across along at least a portion of the elongated member, the sleeve being connected to the frame and being operable to move the frame between the first position and the second position, each of the plurality of openings in the housing being spaced a distance of at least 17 inches from the distal end of the sleeve; and a locking element pivotably connected to the elongated member for pivoting movement between a locked position, in which the locking element secures the at least one of the plurality of chambers to the elongated member, and an unlocked position, in which the at least one of the plurality of chambers is removable from the elongated member.

* * * * *